(12) United States Patent
Hild et al.

(10) Patent No.: US 8,890,466 B2
(45) Date of Patent: Nov. 18, 2014

(54) CIRCUIT ARRANGEMENT

(75) Inventors: Bernhard Hild, Baiersdorf (DE);
Christian Maul, Nürnberg (DE);
Günter Schwesig, Erlangen (DE);
Hanno Walders, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 21 days.

(21) Appl. No.: 13/426,282

(22) Filed: Mar. 21, 2012

(65) Prior Publication Data

US 2013/0069567 A1 Mar. 21, 2013

(30) Foreign Application Priority Data

Mar. 22, 2011 (EP) .................................... 11159196

(51) Int. Cl.
| | | |
|---|---|---|
| *H02K 7/10* | (2006.01) | |
| *H02K 17/32* | (2006.01) | |
| *H02K 23/68* | (2006.01) | |
| *H02K 27/30* | (2006.01) | |
| *H02P 3/00* | (2006.01) | |
| *H02P 3/04* | (2006.01) | |
| *H02K 49/00* | (2006.01) | |

(52) U.S. Cl.
CPC . *H02K 49/00* (2013.01); *H02P 3/04* (2013.01)
USPC ............................ 318/811; 318/362; 318/599

(58) Field of Classification Search
USPC ................. 318/362; 363/16, 79, 80, 124, 131
See application file for complete search history.

(56) References Cited

U.S. PATENT DOCUMENTS

| 4,516,185 | A | * | 5/1985 | Culligan et al. ............... 361/154 |
|---|---|---|---|---|
| 5,019,952 | A | * | 5/1991 | Smolenski et al. ............. 363/16 |
| 5,483,192 | A | * | 1/1996 | Tai ................................ 327/440 |
| 5,811,805 | A | * | 9/1998 | Osakabe et al. ............. 250/311 |
| 2009/0240347 | A1 | | 9/2009 | Walders et al. |
| 2010/0182813 | A1 | * | 7/2010 | Asano et al. .................. 363/126 |
| 2011/0068723 | A1 | * | 3/2011 | Maiocchi ................... 318/400.3 |

FOREIGN PATENT DOCUMENTS

| DE | 10 2006060 | 6/2008 |
|---|---|---|
| EP | 1974870 A1 * | 10/2008 |
| GB | 2441570 | 3/2008 |

* cited by examiner

*Primary Examiner* — Eduardo Colon Santana
*Assistant Examiner* — Devon Joseph
(74) *Attorney, Agent, or Firm* — Henry M Feiereisen LLC

(57) ABSTRACT

A circuit arrangement, especially for supplying an electromagnetic holding brake with a clocked supply voltage, includes a module for controlled provision of a clocked supply voltage for free-wheeling operation of the holding brake. The module has a switching unit for switching off the supply voltage for braking operation. A free-wheeling diode and a suppressor diode are connected in parallel to an inductance of the holding brake, with the free-wheeling diode being effective in free-wheeling operation only and the suppressor diode being effective in braking operation only.

5 Claims, 3 Drawing Sheets

CIRCUIT ARRANGEMENT

CROSS-REFERENCES TO RELATED APPLICATIONS

This application claims the priority of European Patent Application, Serial No. 11159196, filed Mar. 22, 2011, pursuant to 35 U.S.C. 119(a)-(d), the content of which is incorporated herein by reference in its entirety as if fully set forth herein.

BACKGROUND OF THE INVENTION

The present invention relates to a circuit arrangement, especially for supplying power to an electromagnetic holding brake with a clocked supply voltage.

The following discussion of related art is provided to assist the reader in understanding the advantages of the invention, and is not to be construed as an admission that this related art is prior art to this invention.

One of the items disposed on a powerful electric motor, as is used for example as a variable-speed drive of an industrial machine, is an electromechanical holding brake. The brake serves to brake or to stop the motor shaft quickly and safely in a safety-critical situation (system error, power outage, . . . ) and thus put it into a state which is safe for people and for the system. The brake is also frequently used as a holding brake in order, when a motor is switched on, to prevent to motor shaft starting to turn by itself as a result of external influences.

Such an electromagnetic holding brake is often embodied in the form of what is referred to as a spring-pressure brake. This generally comprises a permanent magnet, an inductance, a spring and friction surfaces (brake surfaces). The inductance and the permanent magnet are attached to a bearing end shield, the friction surface with the spring is attached to the motor shaft. In the no-load state the friction surfaces are pressed together via the field of the permanent magnet.

A spring-pressure brake of this type is pretensioned by a spring force into a braking position. In its idle state it is thus in the brake position and can be released from this brake position ("released") by the application of a voltage in order to free the motor shaft.

A specific voltage is required to release the spring-operated brake. If the voltage applied is too great the field of the permanent magnet is overcompensated by the inductance and the brake drops back into the braking position. The rated braking voltage has very narrow tolerances, for example 24V (DC)±10%.

In principle however, after a release process in which the spring-pressure brake has been released, the braking voltage present is reduced from the rated voltage to what is referred to as the holding voltage (for example 16V (DC)). After a release process the air gap produced and also the spring resetting force are sufficient to hold the brake in a released position with the holding voltage or the holding current respectively.

Electromagnetic holding brakes for electrical drives are known from the prior art in which a buck converter is provided to generate the braking voltage which is controlled by a braking voltage setpoint value pulse width modulated with a pulse width modulator. In such an arrangement it is possible, by variation of the duty cycle, to control the braking voltage. In particular it is possible to reduce the voltage at the holding value to below the rated voltage in that the duty cycle of the pulse width modulation is reduced. This enables the power loss during the released mode to be explicitly reduced.

In order to ensure secure brake management a suppressor diode is typically connected in a drive in parallel to the inductance of the holding brake. With a rapid application of the holding brake or with a rapid de-magnetization respectively the windings of the holding brake inductance aim to maintain the current flowing through them (free-wheeling current) so that in some circumstances very high overvoltage peaks occur. The suppressor diode suppresses the overvoltage pulses arising through the inductance (for example to 39V), in that the surplus energy is consumed by it or conducted by it. The suppressor diode thus protects the holding brake as well as the control electronics against damage.

If the holding brake is controlled with a pulse width-modulated voltage signal the problem arises here of the suppressor diode having free-wheeling current permanently applied to it, wherein the power loss arising in such cases cannot be removed.

It would be desirable and advantageous to provide an improved circuit arrangement for an electromagnetic holding brake and to enable control of the holding brake with a clocked supply voltage and to enable rapid application of the holding brake.

SUMMARY OF THE INVENTION

According to one aspect of the present invention, a circuit arrangement for an electromagnetic holding brake includes a module for controlled provision of a clocked supply voltage for free-wheeling operation of the holding brake, the module having a switching unit for switching off the supply voltage for braking operation, and a free-wheeling diode connected in parallel to an inductance of the holding brake, and a suppressor diode connected in parallel to the inductance, wherein the free-wheeling diode is only effective in free-wheeling operation and the suppressor diode is only effective in braking operation.

Thus in clocked or pulse mode the suppressor diode is bypassed, through which the power loss arising can be advantageously reduced. At the same time, when the brake is deactivated, rapid demagnetization is still possible by the suppressor diode.

A holding brake is in particular to be understood as a spring-pressure brake of the type described at the start. Free-wheeling operation is to be understood as the provision of a supply voltage at which the holding brake is in a released state. Braking operation is to be understood as the disconnection of the holding brake from the supply voltage for rapid application of the holding brake or for rapid demagnetization of the inductance respectively.

Against this background, according to another advantageous feature of the present invention a free-wheeling path can be provided in which the free-wheeling current of the inductance flows during the free-wheeling operation. The free-wheeling path comprises the free-wheeling diode, the switching unit and the inductance. During the supply with a clocked voltage the free-wheeling diode limits the overvoltage peaks to their conducting-state voltage and short-circuits the inductance via the free-wheeling path.

According to another advantageous feature of the present invention, a switch-of path can be provided in which the inductance is short-circuited by the suppressor diode during braking operation. If the holding brake is disconnected from the supply voltage by tripping the switching unit, the free-wheeling current flows through the suppressor diode and the brake is applied especially quickly.

According to another advantageous feature of the present invention, the free-wheeling path can have a lower conducting-state voltage than the suppressor diode. This ensures that during free-wheeling operation the suppressor diode does not exert any influence on the circuit arrangement.

According to another advantageous feature of the present invention, the circuit arrangement can be equipped with a drive control. One of the purposes of the drive control is to control a first switching transistor of the module with a pulse width-modulated or modulatable control signal.

In a typical embodiment the module in conjunction with the free-wheeling path especially corresponds to a buck converter for which the inductance acts as a storage choke. For use of the holding brake as part of an electrical drive the supply voltage is usually a DC voltage source or a rectified intermediate circuit voltage of a converter assigned to the drive. Through the components of the buck converter this supply voltage is reduced by variation of the duty cycle of the pulse width modulation to a suitable braking voltage value.

According to another advantageous feature of the present invention, the drive control is configured, for releasing the holding brake, to set the supply voltage setpoint value to a release value and after releasing the holding brake, i.e. during free-wheeling operation, to regulate it to a reduced holding value by comparison. The holding value is especially dimensioned so that it is just sufficient to securely prevent the engagement of the holding brake. Thus especially little power loss arises during the free-wheeling operation of the holding brake, which leads to advantageous energy-saving and low-cost operation. This is especially of advantage when the holding brake is used in thermally-critical decentralized drive technology.

According to another advantageous feature of the present invention, the switching unit, the inductance, and the first switching transistor of the module can be connected using a series circuit. Advantageously, the switching unit is connected before the inductance. In addition or as an alternative, the first switching transistor can be connected before the switching unit and the inductance.

According to another advantageous feature of the present invention, the switching unit can include a second switching transistor and a third switching transistor which can be connected in series. These second and third switching transistors can advantageously be controlled by the drive control, wherein to apply the holding brake the first and/or the second switching transistor are switched off. This makes two-channel control of the holding brake possible through which an especially safe brake management is realized. Even after an error in which for example one of the two switching transistors of the switching unit is short-circuited or becomes permanently conductive, the rapid demagnetization of the holding brake is maintained.

According to another advantageous feature of the present invention, the drive control can be configured to detect and evaluate a voltage value as a diagnostic signal at a common voltage reference point of the module and the suppressor diode. With the detected diagnostic signal the drive control is able to check whether the switching transistors of the switching group are operating correctly. The checking is performed for example by a specific switching algorithm while observing the diagnostic signal.

The detected diagnostic signal can further serve as an actual value for a regulation circuit in which the duty cycle of the pulse width modulation is varied for voltage regulation.

This concept is preferably realized for building the circuit arrangement into motor-integrated drive systems. The concept is likewise of advantage in central drive technology, wherein preferably a current regulation is used. For a voltage regulation an additional sensor line would be necessary for detecting the voltage directly at the holding brake. With current regulation the diagnostic signal is especially a voltage signal which is detected for example via a shunt resistor.

This makes it possible to increase the accuracy of the holding voltage or the holding current respectively of the holding brake in free-wheeling operation or these characteristic values can be adhered to more precisely. Thus the tolerances of the supply voltage, different on/off times, the temperature dependency of the brake winding resistance etc. can also be compensated for in order to get as close as possible to the lower value of the characteristic variables.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
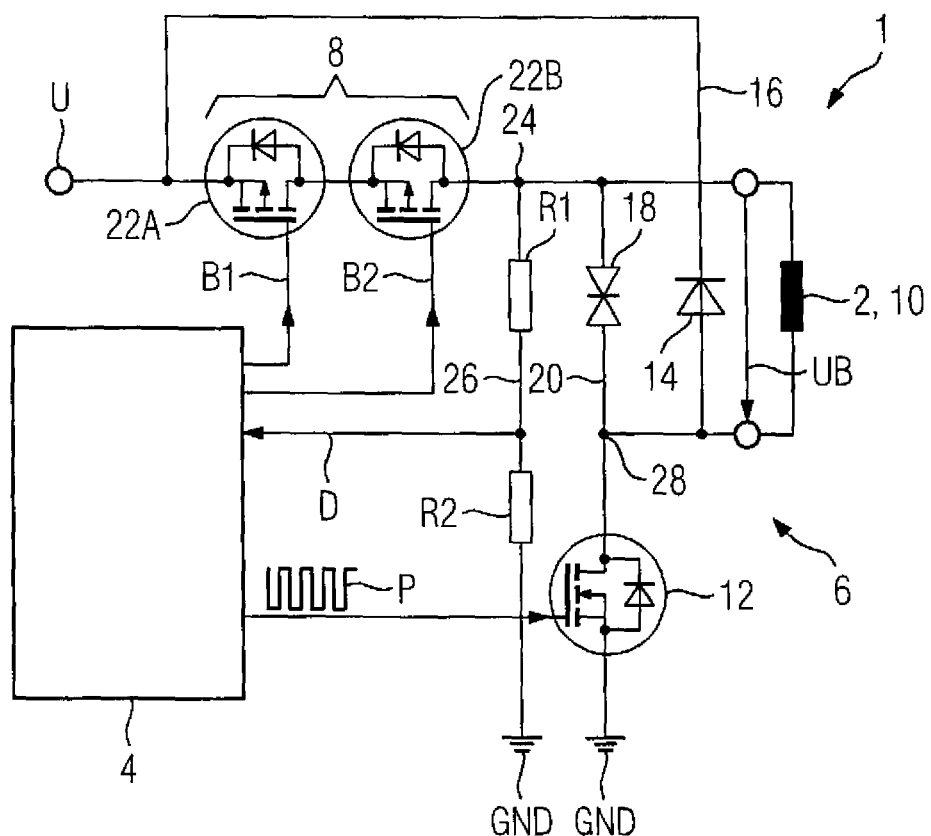
FIG. 1 is a principal circuit diagram of a first embodiment of a circuit arrangement in accordance with the present invention, with coupled holding brake.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a principal circuit diagram of a first embodiment of a circuit arrangement in accordance with the present invention, generally designated by reference numeral 1, for a pulse width-modulated control of an electromagnetic holding brake 2. The circuit arrangement 1 is designed to be connected to a DC voltage U of an electrical drive.

The circuit arrangement 1 comprises a drive control 4 which in this embodiment is formed at least essentially by a microcontroller with control and evaluation software implemented thereon. The circuit arrangement 1 further comprises a buck converter 6, with a switch unit 8, an inductance 10 of the holding brake 2, a first switching transistor 12 and a free-weeding diode 14. The inductance 10 and the switching unit 8 are connected in series for this purpose and bridged by the free-wheeling diode 14 polarized in the blocking direction. The path between inductance 10, free-wheeling diode 14 and switching unit 8 forms a free-wheeling path 16 or also free-wheeling circuit.

The buck converter 6 is used for reducing the DC voltage U and is controlled by the drive control 4 with a pulse width-modulated signal P. The signal P switches the switching transistor 12 on and off in accordance with the duty cycle through which the DC voltage U is regulated to a braking voltage UB for operating the holding brake 2. The brake voltage UB corresponds to the average value of the clocked direct current voltage U over the period of the signal P.

A suppressor diode 18 is additionally connected in parallel to the inductance 10 and the free-wheeling diode 14. The path between the inductance 10 and the suppressor diode 18 forms a switch-off path 20 or so switch-off circuit.

The switching unit 8 comprises to further switching transistors 22A and 22B which are connected in series to one another. The switching transistors 12, 22A and 22B are especially self-blocking MOSFETs with integrated inverse diodes and have especially short switching times by comparison with conventional power MOSFETs. The mass-side switching transistor 12 is especially an n-channel MOSFET and the plus-pole-side switching transistors 22A and 22B are especially p-channel MOSFETs.

The switching transistors 22A and 22B are controlled by the drive control 4 with the switch-off signals B1 and B2. In this case the drive control 4 sends switch-off signal B1 to switching transistor 22A and switch-off signal B2 to switching transistor 22B. The switch-off signals B1 and B2 switch the switching transistors 22A and 22B to conductive during free-wheeling operation.

Arranged at a node 24 in parallel to the buck converter 6 is a voltage divider 26 which is connected to a ground GND. The voltage divider 26 comprises two suitably dimensioned ohmic resistors R1 and R2, via which a diagnostic signal T in the form of a voltage is tapped of and sent to the drive control 4.

For checking whether the switching transistors 22A and 22B are operating correctly, the switch-off signals B1 and B2 are switched on and off in a specific switching algorithm and the diagnostic signal D is detected by the drive control 4. With this two-channel brake control the drive control 4 is configured for an especially safe brake management. Even in the event of an error when for example one of the switching transistors 22A or 22B short circuits or becomes permanently conductive, it is still possible to disconnect the holding brake 2 from the supply voltage. Thus, even in the event of an error, a rapid demagnetization of the inductance 10 via the suppressor diode 18 and thus a rapid application of the holding brake 2 is possible.

If the switching transistor 12 is switched on, an electrical current flows from the DC voltage U through the switching unit 8, the inductance 10 through the switching transistor 12 to the ground GND. Neither the free-wheeling diode 14 nor the suppressor diode 18 exercises an active function in this case. At the same time the holding brake 2 is supplied with the DC voltage U (ignoring the voltage dropping at the switching transistors 22A and 22B) or with a braking voltage UB respectively.

If the switching transistor 12 is switched off, the self-induction of the inductance 10 ensures that a current initially continues to flow as a free-wheeling current in the original direction. This leads to a voltage peak which adds itself to the brake current UB and in doing so exceeds the breakthrough voltage of the free-wheeling diode 14. The free-wheeling diode 14 becomes conductive and the free-wheeling current flows through the free-wheeling circuit 16. At the node 24 the free-wheeling current splits into a part flow through the inductance 10 and a part flow through the voltage divider 26 to ground GND.

During the pulse operation the free-wheeling diode 14 thus limits the overvoltage peaks to their conductive-state voltage and short-circuits the inductance 10 via the free-wheeling path 16. In this case the voltage is limited so that neither the holding brake 2 nor the circuit arrangement 1 will be damaged. If the brake voltage UB falls again and falls below the breakthrough voltage of the free-wheeling diode 14, the free-wheeling diode 14 blocks once again.

In braking operation the signals B1 and B2 from the drive control 4 are no longer sent to the switching transistors 22A and 22B, which causes said transistors to block and disconnect the holding brake 2 from the DC voltage U. The free-wheeling path 16 is likewise interrupted by this, through which the overvoltage peaks cannot be removed via the free-wheeling diode 14. Thus the suppressor diode 18 acts instead, which becomes conductive when its breakthrough voltage is exceeded.

In a suitable dimensioning, one release of the holding brake to the duty cycle of the signal P is briefly regulated to 100%, so that a release value as an (effective) brake voltage UB of 24V is present at the inductance 10. After the release there is a switch offset in time to pulse operation. The signal P in this case has a pulse frequency of around 8 kHz as well as a corresponding duty cycle with which the braking voltage UB reduces to a holding voltage of the holding brake 2 of around 16V. The breakthrough voltage of the suppressor diode lies at around 39V.

The beginning of pulse operation likewise also indicates the beginning of free-wheeling operation, in which the free-wheeling current arising in the off times of the switching transistor 12 flows through the free-wheeling path 16 through the free-wheeling diode 14 and the switching unit 8 back into the inductance 10. If the holding brake 2 is disconnected from the DC voltage U by tripping of one or both switching transistors 22A and/or 22B, in braking operation the suppressor diode 18 connected in parallel to the free-wheeling path 16 acts instead and the holding brake 2 is applied correspondingly rapidly.

Figure 2:
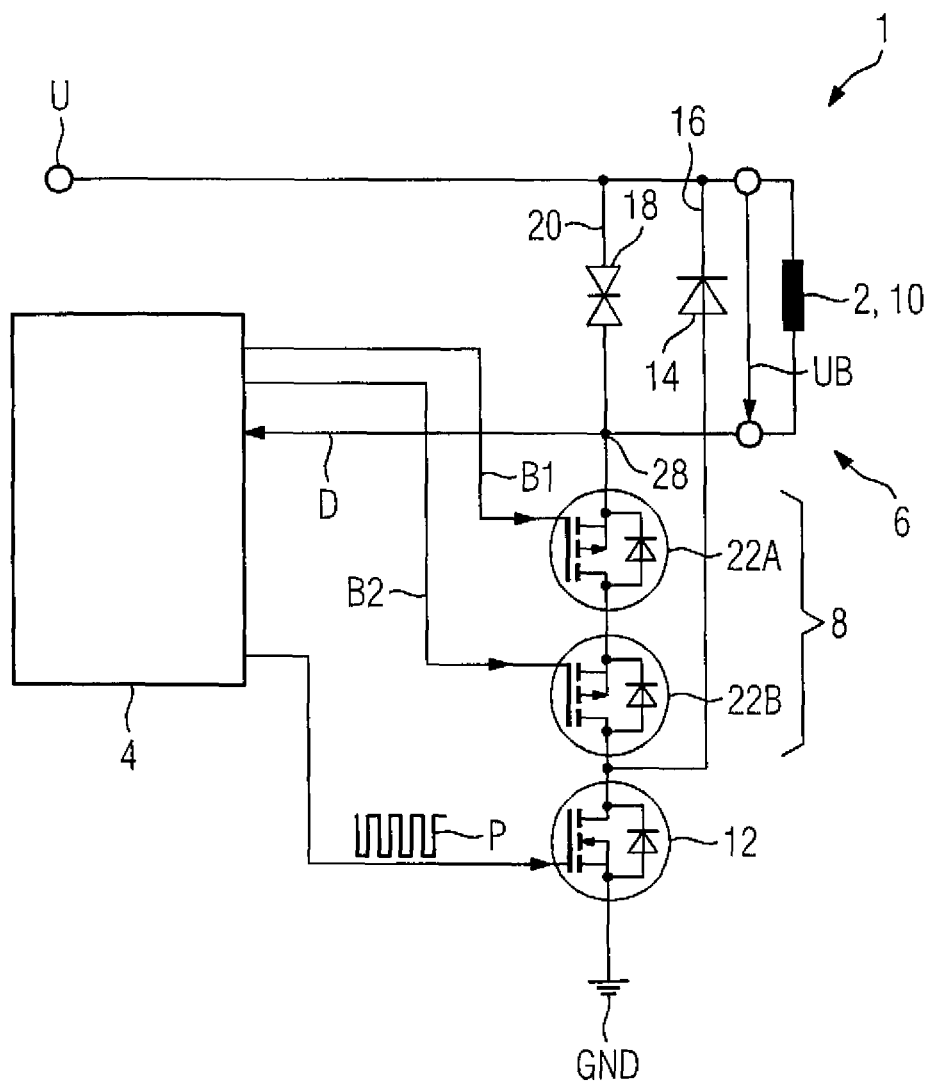
FIG. 2 is a circuit diagram of a first alternative embodiment of the circuit arrangement of FIG. 1.

Two further embodiment variants of the switching arrangement 1 will be explained below with reference to FIG. 2 and FIG. 3. The essential feature distinguishing the different embodiment variants D from one another is the relative arrangement of the switching transistor 12 the switching unit 8 and the inductance 10 in the series circuit. It is important above all that the switching unit 8 and the inductance 10 are a part of the free-wheeling path 16 so that, after the switching unit 8 is tripped in braking operation, only the suppressor diode 18 acts.

Figure 3:
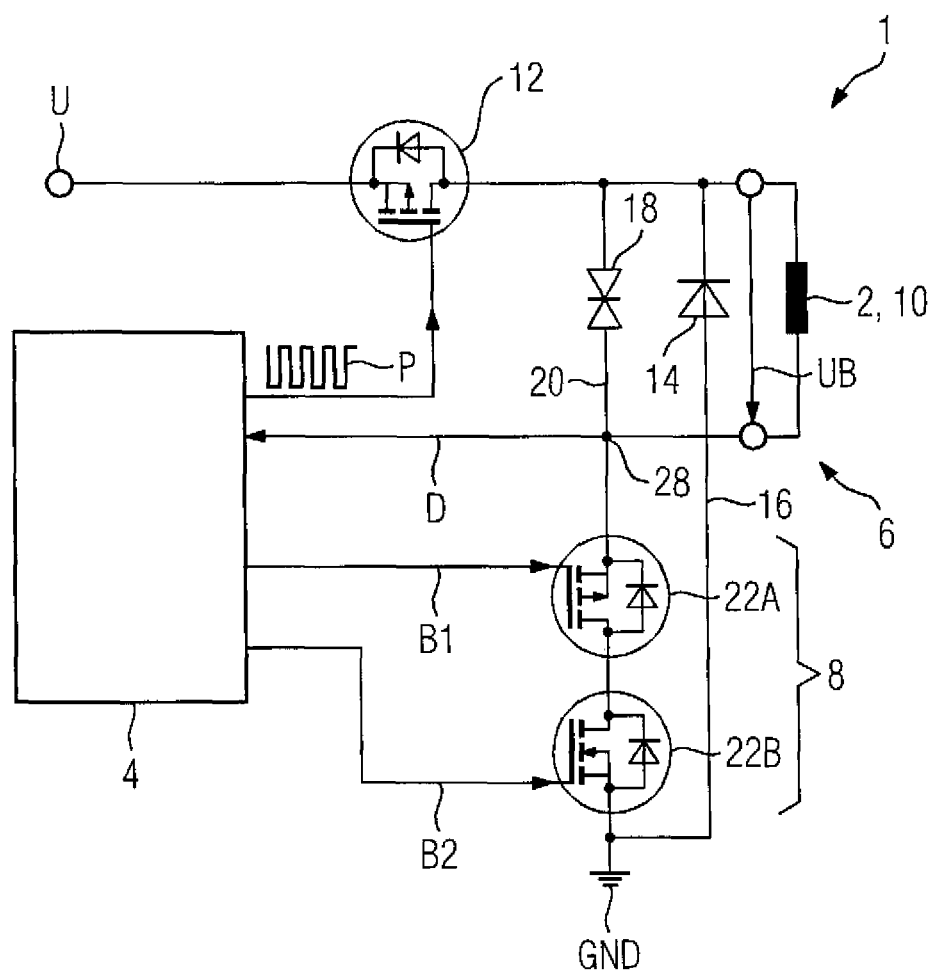
FIG. 3 is a circuit diagram of a second alternative embodiment of the circuit arrangement of FIG. 1.

In FIG. 3 the switching transistor 12 is also embodied conductive for plus-pole-side switching as a p-channel. The switching transistor 22B in this embodiment is embodied on the ground side and thus typically as an n-channel MOSFET.

In summary it is possible, as a result of the clever arrangement of the free-wheeling diode 14 the suppressor diode 18 and the switching transistors 12, 22A and 22B, to bypass the suppressor diode 18 in pulse operation or free-wheeling operation respectively. This means that the power loss arising is advantageously reduced both at the holding brake 2 and also at the suppressor diode 18. At the same time, during an application of the brake (brake operation) of the holding brake 2 a rapid demagnetization via the suppressor diode 18 is still possible.

The invention is not restricted to the exemplary embodiments described here. Other variants of the invention can also be derived from these instead by the person skilled in the art without departing from the subject matter of the invention. In particular all individual features described in conjunction with the different exemplary embodiments are also able to be combined in other ways, without departing from the subject matter of the invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A circuit arrangement for an electromagnetic holding brake forming an inductance, the circuit arrangement comprising:
   a first switching transistor configured to supply a regulated clocked holding voltage for free-wheeling operation of the holding brake;
   a suppressor diode connected directly in parallel with the holding brake, said suppressor diode having a rated breakdown voltage above which significant electrical conduction occurs;
   a switching unit connected in series with the first switching transistor and the holding brake between a DC voltage;
   a reverse-biased free-wheeling diode having a rated reverse breakdown voltage that is smaller than the rated breakdown voltage of the suppressor diode, said free-wheeling diode connected in parallel with the serially-connected switching unit and the holding brake; and
   a drive module configured to switch the switching unit and the first switching transistor on so as to supply the holding voltage to the holding brake over a free-wheeling current path for free-wheeling operation and to switch the switching unit and the first switching transistor off so as to disconnect the holding voltage from the holding brake for braking operation of the holding brake,
   wherein during the braking operation the free-wheeling current path is electrically open, and wherein only the suppressor diode and the inductance form a switch-off path which exclusively conducts current during the braking operation.

2. The circuit arrangement of claim 1, wherein the drive module controls the first switching transistor with a pulse width-modulated signal.

3. The circuit arrangement of claim 2, wherein the drive module is configured to set a supply voltage for a release of the holding brake to a release value and to regulate the supply voltage, after release of the holding brake, to a holding value which is smaller than the release value and dimensioned to safely prevent an engagement of the holding brake.

4. The circuit arrangement of claim 1, wherein the switching unit comprises a second switching transistor and a third switching transistor which are connected in series.

5. The circuit arrangement of claim 2, wherein the drive module is configured to detect and evaluate a voltage value as a diagnostic signal at a voltage reference point of the holding brake.

* * * * *